(12) United States Patent
Yokoyama

(10) Patent No.: US 11,789,881 B2
(45) Date of Patent: Oct. 17, 2023

(54) COMMUNICATION APPARATUS, CONTROL METHOD, AND STORAGE MEDIUM

(71) Applicant: CANON KABUSHIKI KAISHA, Tokyo (JP)

(72) Inventor: Shuma Yokoyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/947,235

(22) Filed: Sep. 19, 2022

(65) Prior Publication Data

US 2023/0012913 A1 Jan. 19, 2023

Related U.S. Application Data

(63) Continuation of application No. PCT/JP2021/005321, filed on Feb. 12, 2021.

(30) Foreign Application Priority Data

Mar. 30, 2020 (JP) .................................. 2020-061110

(51) Int. Cl.
*G06F 13/10* (2006.01)
*G06F 13/38* (2006.01)

(52) U.S. Cl.
CPC .......... *G06F 13/382* (2013.01); *G06F 13/102* (2013.01)

(58) Field of Classification Search
CPC .............................. G06F 13/382; G06F 13/102
USPC ........................................................ 710/305
See application file for complete search history.

(56) References Cited

U.S. PATENT DOCUMENTS

| 2011/0072185 A1* | 3/2011 | Pinto | G06F 13/387 |
| | | | 710/316 |
| 2015/0052266 A1* | 2/2015 | Hershko | G06F 13/4265 |
| | | | 710/13 |
| 2015/0356040 A1* | 12/2015 | Shin | G06F 13/4022 |
| | | | 711/115 |
| 2019/0205277 A1* | 7/2019 | Koh | G06F 12/0246 |
| 2019/0280534 A1 | 9/2019 | Park | |
| 2020/0201803 A1* | 6/2020 | Maeda | G06F 13/4027 |

(Continued)

FOREIGN PATENT DOCUMENTS

| JP | 10-40206 A | 2/1998 |
| JP | 2006-209744 A | 8/2006 |

(Continued)

OTHER PUBLICATIONS

The International Search Report dated May 11, 2021 of International Application No. PCT/JP2021/005321, which is enclosed.

*Primary Examiner* — Christopher B Shin
(74) *Attorney, Agent, or Firm* — Cowan, Liebowitz & Latman, P.C.

(57) ABSTRACT

There is provided a communication apparatus comprising a connector that includes a plurality of signal lines and connects to an external recording device. The control unit performs control to determine whether a second signal has been input before a predetermined time period elapses since a first signal was output to the external recording device, the second signal indicating that the external recording device is compatible with a second transfer mode. In a case where it is determined that the second signal has been input, the control unit performs control to perform communication in the second transfer mode.

17 Claims, 9 Drawing Sheets

(56) References Cited

U.S. PATENT DOCUMENTS

| | | | |
|---|---|---|---|
| 2020/0233818 A1* | 7/2020 | Hsieh | G06F 13/4282 |
| 2020/0371983 A1* | 11/2020 | Koh | H05K 5/026 |
| 2023/0176757 A1* | 6/2023 | Shiau | G06F 3/0604 |
| | | | 711/154 |

FOREIGN PATENT DOCUMENTS

| | | |
|---|---|---|
| JP | 2009-258773 A | 11/2009 |
| JP | 2012-093926 A | 5/2012 |

\* cited by examiner

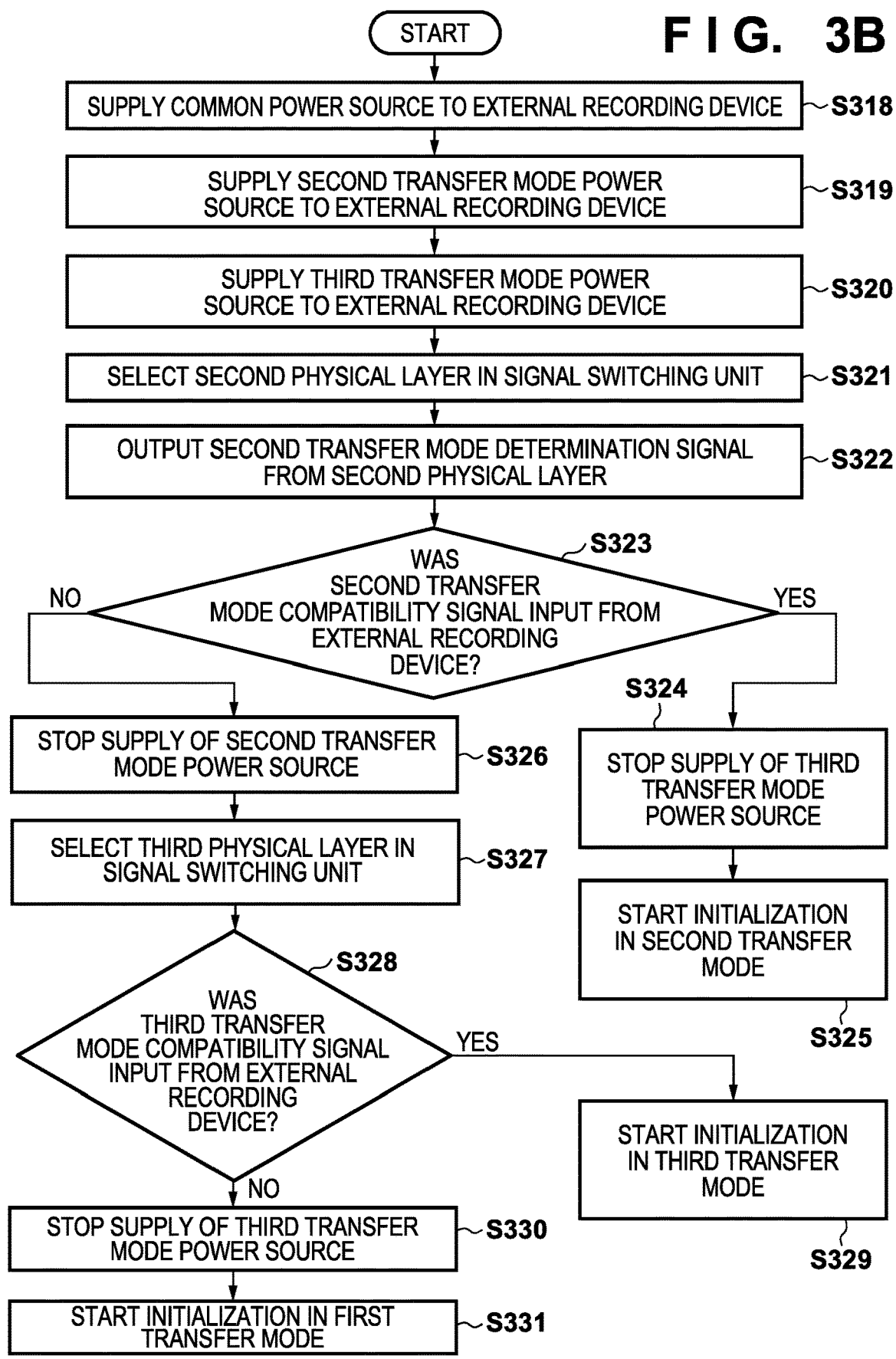

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2021/005321, filed Feb. 12, 2021, which claims the benefit of Japanese Patent Application No. 2020-061110, filed Mar. 30, 2020, both of which are hereby incorporated by reference herein in their entirety.

BACKGROUND OF THE INVENTION

Field of the Invention

The present invention relates to a communication apparatus, a control method, and a storage medium.

Background Art

In recent years, the transfer speed of external recording devices, such as a memory card, is increasing. When a new standard is formulated, new transfer techniques are adopted, such as a change from parallel transfer to high-speed serial transfer, and an increase in frequencies, for example; as a result, the transfer speed increases.

Also, techniques to reduce a time period of initialization of a memory card have been proposed as in, for example, PTL1.

CITATION LIST

Patent Literature

PTL1: Japanese Patent Laid-Open No. 2006-209744

It is desirable that a communication apparatus that reads and writes data by performing communication with an external recording device be compatible with the standards of a plurality of external recording devices via a single slot in view of, for example, area conservation and cost reduction. In this case, the communication apparatus needs to determine with which standard an external recording device inserted in the slot is compatible among the plurality of standards.

However, the technique of PTL1 is a technique that involves a single standard, and is not a technique for determining the standard with which the external recording device is compatible among the plurality of standards.

SUMMARY OF THE INVENTION

The present invention has been made in view of the foregoing situation, and provides a technique to appropriately determine with which standard an external recording device is compatible among a plurality of standards.

In order to solve the aforementioned problem, the present invention provides a communication apparatus, comprising: a connector that includes a plurality of signal lines and connects to an external recording device; and at least one processor and/or at least one circuit which functions as a control unit configured to control communication with the external recording device connected to the connector, wherein the control unit performs control to: determine whether a second signal has been input before a predetermined time period elapses since a first signal was output to the external recording device, the second signal indicating that the external recording device is compatible with a second transfer mode; in a case where it is determined that the second signal has been input, perform communication in the second transfer mode; and in a case where it is determined that the second signal has not been input, start first initialization processing for performing communication in a first transfer mode, determine whether the external recording device is compatible with a third transfer mode based on communication in the first transfer mode, and in a case where it is determined that the external recording device is compatible with the third transfer mode, perform communication in the third transfer mode.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3A-1 is a flowchart of determination processing for a case where a combination of "normal determination" and "determination with priority on the second transfer mode" has been selected as a determination mode in a second embodiment.

FIG. 3A-2 is a flowchart of determination processing for a case where a combination of "normal determination" and "determination with priority on the second transfer mode" has been selected as a determination mode in the second embodiment.

FIG. 3B is a flowchart of determination processing for a case where a combination of "high-speed determination" and "determination with priority on the second transfer mode" has been selected as a determination mode in the second embodiment.

DESCRIPTION OF THE EMBODIMENTS

Figure 1:
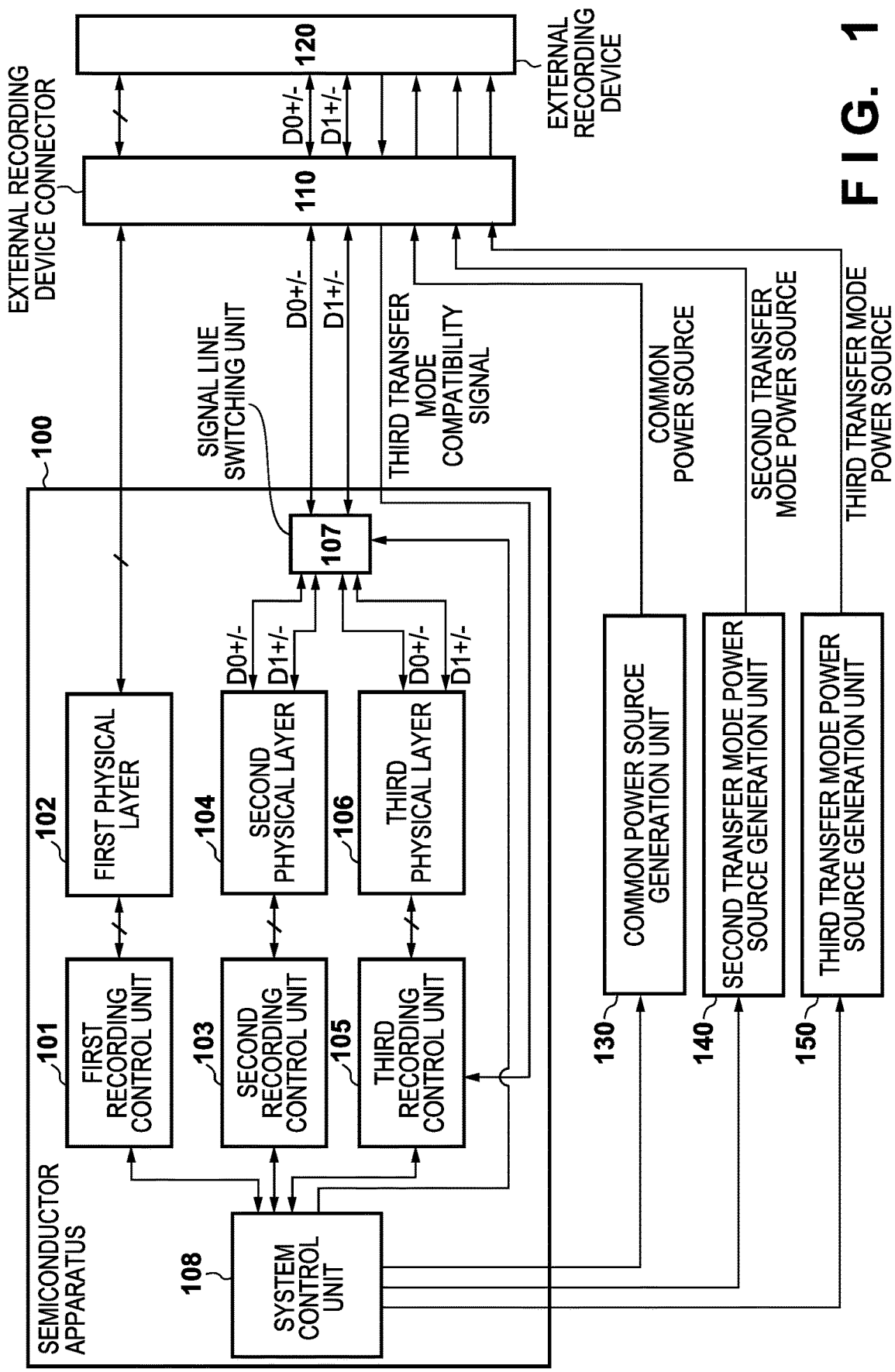
FIG. 1 is a block diagram of a communication apparatus that reads and writes data by communicating with an external recording device 120.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram of a communication apparatus that reads and writes data by communicating with an external recording device 120. This communication apparatus can be mounted on, for example, an image capturing apparatus or the like. The communication apparatus includes a semiconductor apparatus 100, an external recording device connector 110, a common power source generation unit 130, a second transfer mode power source generation unit 140, and a third transfer mode power source generation unit 150.

The semiconductor apparatus 100 records (writes) or reproduces (reads) data by communicating with the external recording device 120 via the external recording device connector 110. For example, the semiconductor apparatus 100 is an LSI (Large Scale Integrated Circuit) mounted on a camera, a smartphone, a personal computer, or the like.

The external recording device connector 110 is a connector (connection unit) for connecting to the attachable and removable external recording device 120, and includes an electrical contact for connecting the semiconductor apparatus 100 and the external recording device 120. For example, the external recording device connector 110 is a slot for a recording medium. The external recording device 120 holds data processed by the semiconductor apparatus 100 in a ROM (Read Only Memory), and also transmits/receives data recorded in a ROM.

The semiconductor apparatus 100 and the external recording device 120 have a plurality of transfer modes with different transfer speeds. The semiconductor apparatus 100 judges with which transfer mode the external recording device 120 is compatible, and they perform transfer in the same transfer mode. A sequence for determining a transfer mode will be described later with reference to FIG. 2A to FIG. 2D. The present embodiment will be described using an exemplary case where the plurality of transfer modes with different transfer speeds are three transfer modes, namely a first transfer mode, a second transfer mode, and a third transfer mode.

The first transfer mode is a transfer mode whose transfer speed is lower than the transfer speeds of the second transfer mode and the third transfer mode. The second transfer mode is a transfer mode whose transfer speed is higher than the transfer speed of the first transfer mode and lower than the transfer speed of the third transfer mode. The third transfer mode is a transfer mode whose transfer speed is higher than the transfer speeds of the first transfer mode and the second transfer mode. Also, while the external recording device 120 includes an independent electrical terminal for the first transfer mode, it includes a shared electrical terminal for the second transfer mode and the third transfer mode. However, this electrical terminal configuration is merely an example; for example, all of the transfer modes may share the same electrical terminal.

The common power source generation unit 130 generates a power source that is commonly necessary when the external recording device 120 performs transfer in any transfer mode (a common power source). The second transfer mode power source generation unit 140 generates a power source that is necessary when the external recording device 120 performs transfer in the second transfer mode (a second transfer mode power source). The second transfer mode power source is not necessary when the external recording device 120 performs transfer in the first transfer mode or the third transfer mode. The third transfer mode power source generation unit 150 generates a power source that is necessary when the external recording device 120 performs transfer in the third transfer mode (a third transfer mode power source). The third transfer mode power source is not necessary when the external recording device 120 performs transfer in the first transfer mode or the second transfer mode.

In the following description, it is assumed that the first transfer mode is a transfer mode that conforms to the UHS-I standard, the second transfer mode is a transfer mode that conforms to the UHS-II standard, and the third transfer mode is a transfer mode that conforms to the SDExpress standard. It is assumed that the external recording device 120 supports the first transfer mode (UHS-I standard), and in some cases, supports at least one of the second transfer mode (UHS-II standard) and the third transfer mode (SDExpress standard) as an option. However, the present embodiment is not limited to various types of standards mentioned herein, and each transfer mode may be a transfer mode that conforms to another standard. For example, the second transfer mode may be a transfer mode that conforms to the UHS-III standard. Note that the first transfer mode (UHS-I standard) and the second transfer mode (UHS-II standard) are compatible, and the first transfer mode (UHS-I standard) and the third transfer mode (SDExpress standard) are compatible. However, the second transfer mode (UHS-II standard) and the third transfer mode (SDExpress standard) are not compatible. However, a part of signal lines (at least one signal line; for example, VDD1) is used as the same signal line in any of the first transfer mode (UHS-1 standard), the second transfer mode (UHS-II standard), and the third transfer mode (SDExpress standard).

The semiconductor apparatus 100 includes a first recording control unit 101, a first physical layer 102, a second recording control unit 103, a second physical layer 104, a third recording control unit 105, a third physical layer 106, a signal line switching unit 107, and a system control unit 108.

The first recording control unit 101 is a controller in the first transfer mode, and is a logic circuit for processing data to be transmitted/received, generating a command for transmitting/receiving data, correcting an error in received data, and so on.

The first physical layer 102 is a physical layer in the first transfer mode, and is a circuit that converts logic signals for communication with the first recording control unit 101 into electrical signals for communication with the external recording device 120. For example, the first physical layer 102 is composed of an LVCMOS (Low Voltage Complementary Metal Oxide Semiconductor). Also, communication between the first physical layer 102 and the external recording device 120 is performed using parallel signals.

The second recording control unit 103 is a controller in the second transfer mode, and is a logic circuit for performing processing for packetizing data to be transmitted/received, generating a command for transmitting/receiving data, correcting an error in received data, and so on.

The second physical layer 104 is a physical layer in the second transfer mode, and is a circuit that converts logic signals for communication with the second recording control unit 103 into electrical signals for communication with the external recording device 120. For example, the second physical layer 104 is a PHY (physical layer) that has a SerDes (Serializer/Deserializer) function. Also, communication between the second physical layer 104 and the external recording device 120 is performed using serial signals.

The third recording control unit 105 is a controller in the third transfer mode, and is a logic circuit for performing processing for packetizing data to be transmitted/received, generating a command for transmitting/receiving data, correcting an error in received data, and so on. Also, the third recording control unit 105 can receive an input of a third transfer mode compatibility signal (a third signal), which indicates that the external recording device 120 is compatible with the third transfer mode, from a specific signal line (a third signal line). The supply of a power source from the third transfer mode power source generation unit 150 to the external recording device 120 serves as the trigger that enables the external recording device 120 to generate the third transfer mode compatibility signal. A specific sequence will be described later with reference to FIG. 2B, FIG. 2D, and FIG. 3A-1 to FIG. 3C.

The third physical layer 106 is a physical layer in the third transfer mode, and is a circuit that converts logic signals for communication with the third recording control unit 105 into electrical signals for communication with the external recording device 120. For example, the third physical layer 106 is a PHY (physical layer) that has a SerDes function. Also, communication between the third physical layer 106 and the external recording device 120 is performed using serial signals.

As stated earlier, the external recording device 120 uses a shared electrical terminal in the second transfer mode and the third transfer mode. It is therefore necessary to switch between the connection destinations of signal lines of serial signals (a first signal line and a second signal line) depending on the transfer mode to be used. The signal lines of serial signals (the first signal line and the second signal line) are selectively connected to the second physical layer 104 and the third physical layer 106 via the signal line switching unit 107. The signal line switching unit 107 selects one of the second physical layer 104 and the third physical layer 106 in accordance with the transfer mode to be used, and connects the selected physical layer and the signal lines of serial signals of the external recording device connector 110 (the first signal line and the second signal line).

In accordance with the transfer mode with which the external recording device 120 is compatible, the system control unit 108 switches among the first recording control unit 101, the second recording control unit 103, and the third recording control unit 105 to be used. Also, when performing a transfer in each type of transfer mode, the system control unit 108 provides the common power source generation unit 130, the second transfer mode power source generation unit 140, and the third transfer mode power source generation unit 150 with an instruction for supplying a power source. Furthermore, with respect to the signal line switching unit 107, the system control unit 108 performs control to switch between the use of signal lines of the second physical layer 104 and the use of signal lines of the third physical layer 106. The system control unit 108 is, for example, a CPU (Central Processing Unit) or the like. A specific control sequence will be described later with reference to FIG. 2A to FIG. 2D, and FIG. 3A-1 to FIG. 3C.

Although the signal line switching unit 107 is present in the semiconductor apparatus 100 in the example of FIG. 1, it may be present outside the semiconductor apparatus 100, that is to say, on a printed substrate of the communication apparatus, and the position thereof is not limited. Also, the semiconductor apparatus 100 may include, in place of the signal line switching unit 107, an integrated physical layer (a multi-protocol PHY) in which the second physical layer 104 and the third physical layer 106 are integrated. In this case, the semiconductor apparatus 100 switches between signals of the second recording control unit 103 and signals of the third recording control unit 105 inside the integrated physical layer.

FIG. 2A to FIG. 2D are flowcharts of processing in which the communication apparatus determines the transfer mode with which the external recording device 120 is compatible in the first embodiment.

Figure 2A:
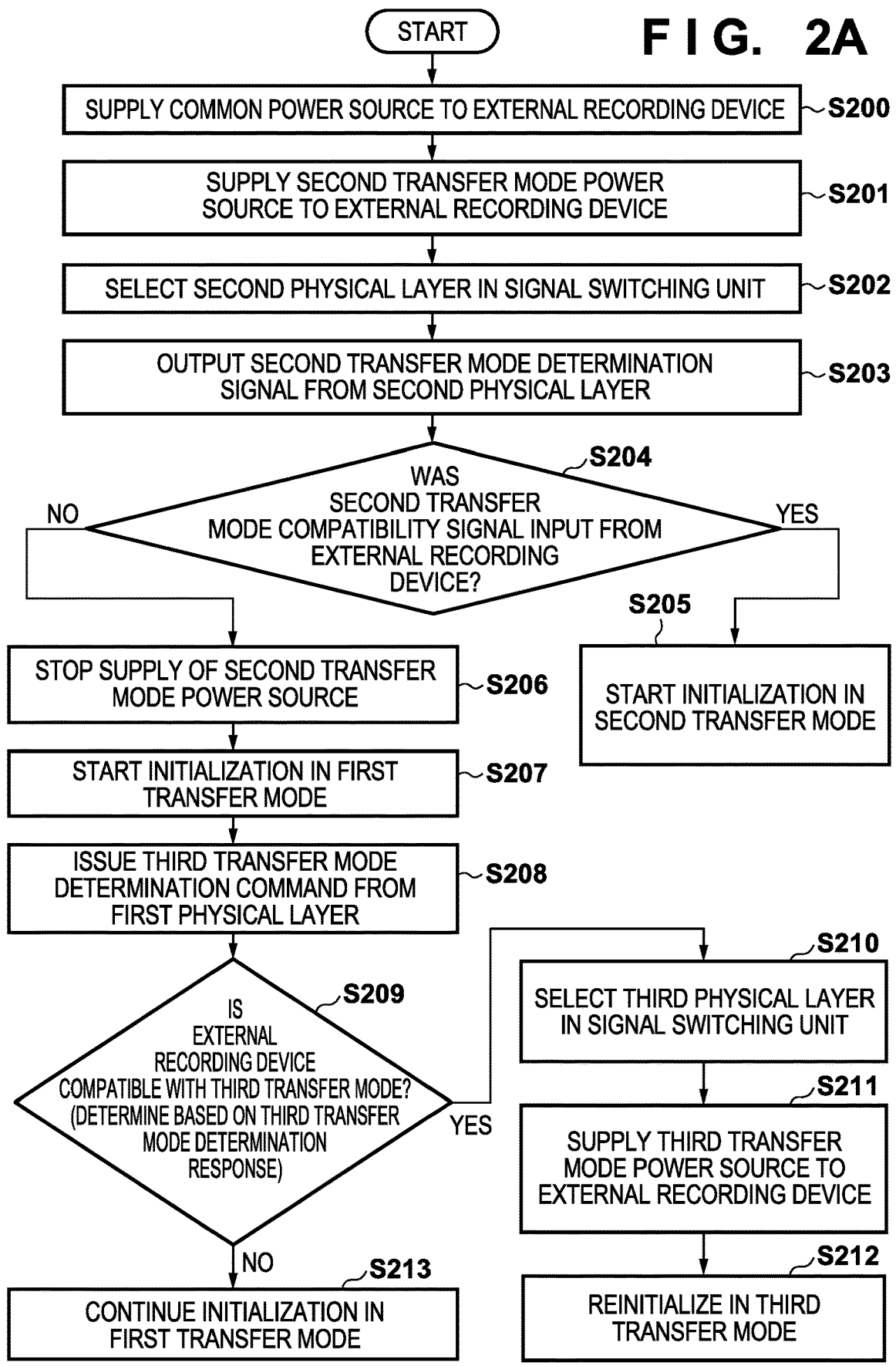
FIG. 2A is a flowchart of determination processing for a case where a combination of "normal determination" and "determination with priority on a second transfer mode" has been selected as a determination mode in a first embodiment.
Figure 2B:
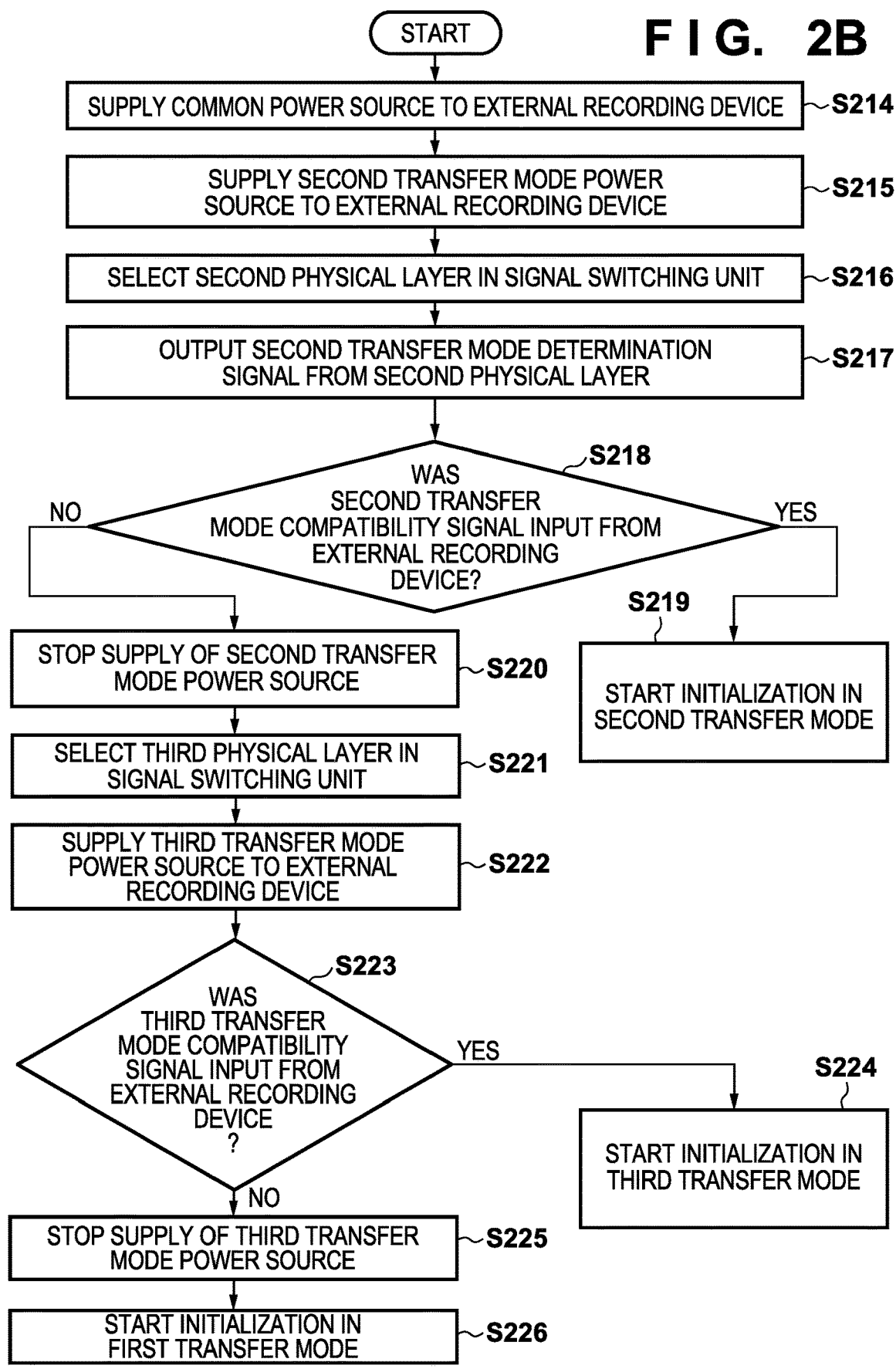
FIG. 2B is a flowchart of determination processing for a case where a combination of "high-speed determination" and "determination with priority on the second transfer mode" has been selected as a determination mode in the first embodiment.
Figure 2C:
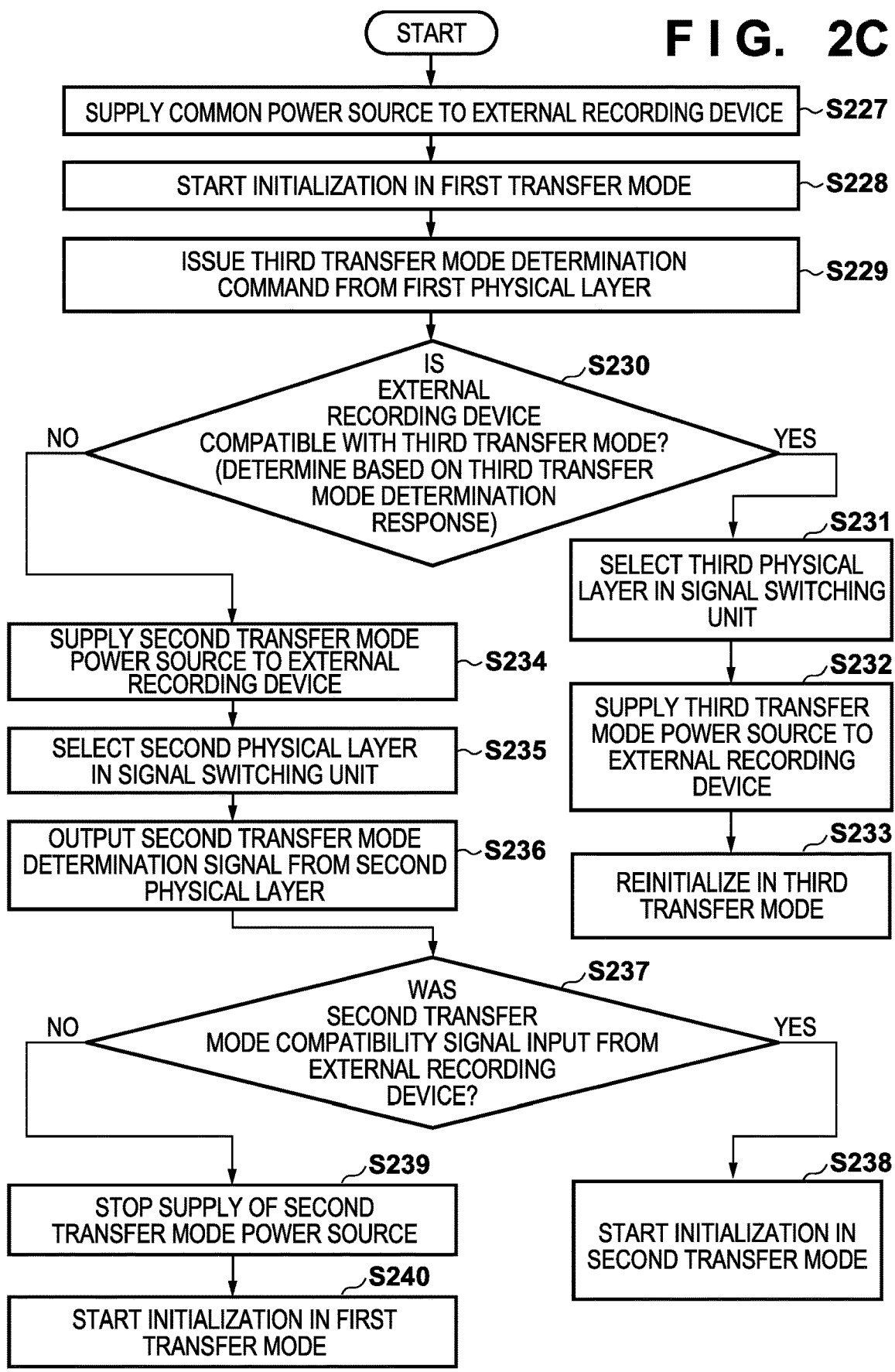
FIG. 2C is a flowchart of determination processing for a case where a combination of "normal determination" and "determination with priority on a third transfer mode" has been selected as a determination mode in the first embodiment.
Figure 2D:
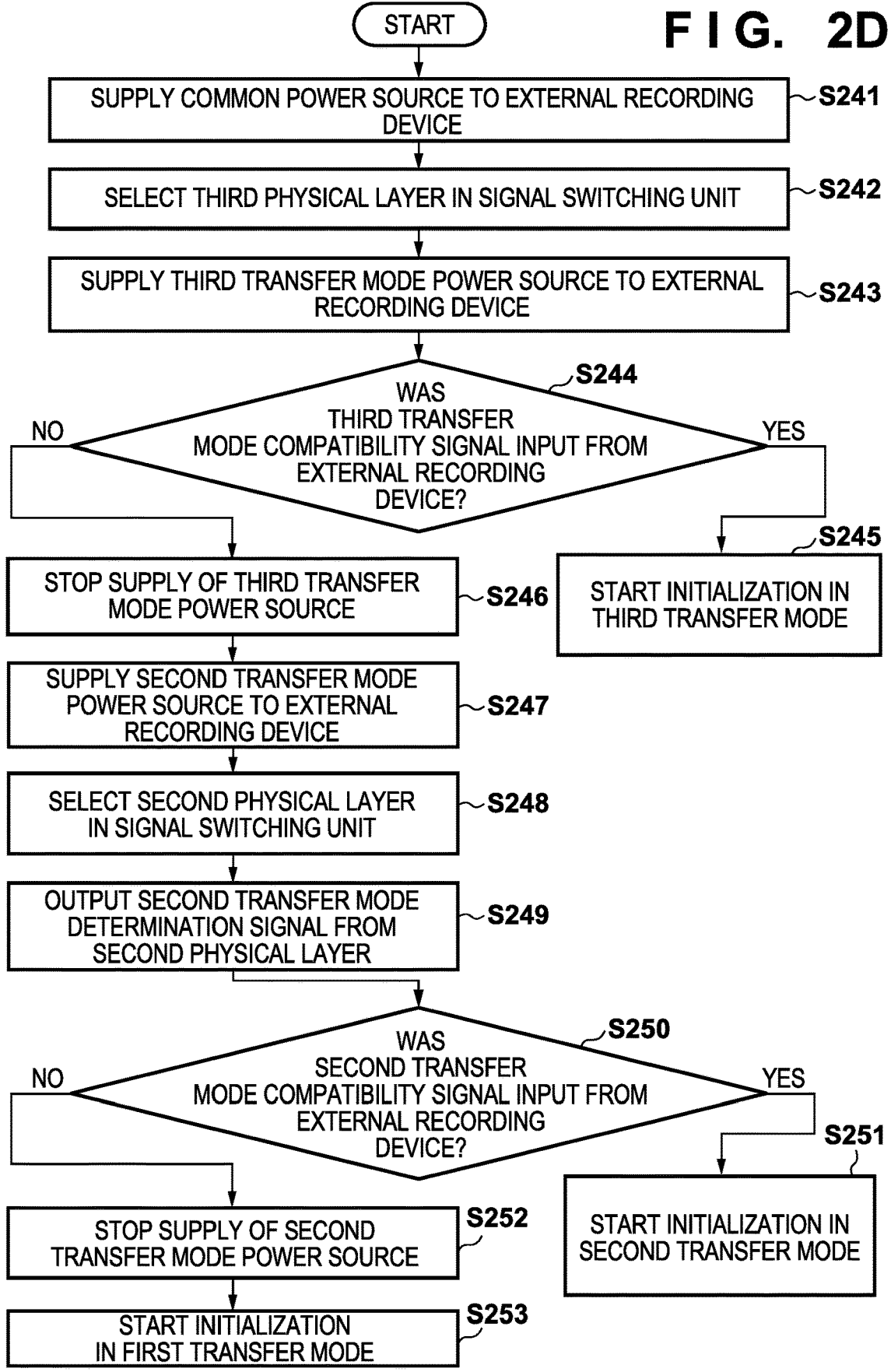
FIG. 2D is a flowchart of determination processing for a case where a combination of "high-speed determination" and "determination with priority on the third transfer mode" has been selected as a determination mode in the first embodiment.

There are a plurality of determination methods for the third transfer mode, and the used determination method differs between FIGS. 2A and 2C and FIGS. 2B and 2D. In FIG. 2A and FIG. 2C, determination of the third transfer mode is made based on communication in the first transfer mode. In FIG. 2B and FIG. 2D, determination based on communication in a specific transfer mode is not made, and the supply of the third transfer mode power source serves as the trigger to make determination of the third transfer mode based on whether the third transfer mode compatibility signal is input. In the cases of FIG. 2A and FIG. 2C, as determination of the third transfer mode is made based on communication, the determination accuracy is improved. However, as it is necessary to execute initialization processing for the first transfer mode prior to determination of the third transfer mode, the time period required for determination processing is relatively long. On the other hand, in the cases of FIG. 2B and FIG. 2D, as determination of the third transfer mode is made without executing the initialization processing for the first transfer mode, the time period required for determination processing is relatively short, but the determination accuracy decreases.

In FIG. 2A and FIG. 2B, determination of the second transfer mode is preferentially made. In a case where the external recording device 120 is compatible with the second transfer mode, the second transfer mode is selected as the transfer mode to be used, regardless of whether the external recording device 120 is compatible with the third transfer mode. On the other hand, in FIG. 2C and FIG. 2D, determination of the third transfer mode is preferentially made. In a case where the external recording device 120 is compatible with the third transfer mode, the third transfer mode is selected as the transfer mode to be used, regardless of whether the external recording device 120 is compatible with the second transfer mode.

In general, determination of the second transfer mode can be executed in a shorter time period than determination of the third transfer mode. Therefore, in a default determination mode, the communication apparatus determines the transfer mode with which the external recording device 120 is compatible in line with the flowchart of FIG. 2A.

Also, the communication apparatus can display a menu screen for selecting a determination mode on a display unit (not shown), and a user can select a determination mode of the communication apparatus via this menu screen. Selection of the determination mode includes selection of a determination speed ("normal determination" or "high-speed determination"), and selection of a mode to be prioritized ("determination with priority on the second transfer mode" or "determination with priority on the third transfer mode").

The default determination mode mentioned earlier refers to the combination of "normal determination" and "determination with priority on the second transfer mode"; in this case, the communication apparatus determines the transfer mode with which the external recording device 120 is compatible in line with the flowchart of FIG. 2A. In a case where the combination of "high-speed determination" and "determination with priority on the second transfer mode" has been selected, the communication apparatus determines the transfer mode with which the external recording device 120 is compatible in line with the flowchart of FIG. 2B. In a case where the combination of "normal determination" and "determination with priority on the third transfer mode" has been selected, the communication apparatus determines the transfer mode with which the external recording device 120 is compatible in line with the flowchart of FIG. 2C. In a case where the combination of "high-speed determination" and "determination with priority on the third transfer mode" has been selected, the communication apparatus determines the transfer mode with which the external recording device 120 is compatible in line with the flowchart of FIG. 2D.

Note that the default determination mode is not limited to the combination of "normal determination" and "determination with priority on the second transfer mode". For example, in a case where external recording devices 120 that are compatible with the third transfer mode have been disseminated in larger numbers than external recording devices 120 that are not compatible with the third transfer mode, the combination of "normal determination" and "determination with priority on the third transfer mode" may be used as the default determination mode.

First, with reference to FIG. 2A, a description is given of determination processing for a case where the combination of "normal determination" and "determination with priority on the second transfer mode" has been selected as the determination mode. The system control unit 108 executes the overall control on the determination processing of FIG. 2A in line with a control program stored in a ROM (not shown), unless specifically stated otherwise. Processing of the flowchart of FIG. 2A is started when the system control unit 108 detects that the external recording device 120 has been connected to the external recording device connector 110.

In S200, the system control unit 108 supplies the common power source to the external recording device 120 by issuing an instruction to the common power source generation unit 130. In S201, the system control unit 108 supplies the second transfer mode power source to the external recording device 120 by issuing an instruction to the second transfer mode power source generation unit 140.

In S202 to S204, the system control unit 108 performs control to determine whether the external recording device 120 is compatible with the second transfer mode. Specifically, in S202, the system control unit 108 performs control to connect the signal lines of the signal line switching unit 107 to the second physical layer 104. In S203, the second recording control unit 103 outputs a second transfer mode determination signal from the second physical layer 104 to the external recording device 120. In S204, the second recording control unit 103 determines whether a second transfer mode compatibility signal, which indicates that the external recording device 120 is compatible with the second transfer mode, has been input from the external recording device 120 before the elapse of a predetermined time period (a first time period) since the second transfer mode determination signal was output. In a case where the second transfer mode compatibility signal has been input, processing proceeds to S205; otherwise, processing proceeds to S206.

In a case where the second transfer mode conforms to the UHS-II standard or the UHS-III standard, the second transfer mode determination signal (a first signal) is STB.L, and the second recording control unit 103 outputs STB.L via a D0 lane (the first signal line). Also, the second transfer mode compatibility signal (a second signal) is STB.L, and in a case where STB.L has been input from a D1 lane (the second signal line), the second recording control unit 103 determines that the second transfer mode compatibility signal has been input. According to the standard, the determination takes up to 200 μs. That is to say, the predetermined time period (the first time period) in S204 is 200 μs.

In S205, the system control unit 108 starts initialization in the second transfer mode (second initialization processing). This enables communication with the external recording device 120 in the second transfer mode. That is to say, in a case where the second initialization processing has been executed, the second recording control unit 103 communicates with the external recording device 120 in the second transfer mode.

In S206, the system control unit 108 stops the supply of the second transfer mode power source to the external recording device 120 by issuing an instruction to the second transfer mode power source generation unit 140.

In S207, the system control unit 108 starts initialization in the first transfer mode (first initialization processing). In S208, the first recording control unit 101 issues a third transfer mode determination command from the first physical layer. As it is necessary to execute the first initialization processing to issue the third transfer mode determination command, a relatively long time period (e.g., a few hundred ms) is required from the start of the first initialization processing in S207 to the issuance of the third transfer mode determination command in S208. In S209, the first recording control unit 101 determines whether the external recording device 120 is compatible with the third transfer mode based on a third transfer mode determination response. In a case where the external recording device 120 is compatible with the third transfer mode, processing proceeds to S210; otherwise, processing proceeds to S213.

In a case where the first transfer mode conforms to the UHS-I standard and the third transfer mode conforms to the SDExpress standard, the third transfer mode determination command is CMD8. Also, the third transfer mode determination response is a response to CMD8, and includes information indicating whether the external recording device 120 is compatible with the third transfer mode. In this way, the execution of the first initialization processing enables communication in the first transfer mode, and determination of the third transfer mode is made based on communication of the command and the response.

In S210, the system control unit 108 selects the third physical layer 106 by issuing an instruction to the signal line switching unit 107. In S211, the system control unit 108 supplies the third transfer mode power source to the external recording device 120 by issuing an instruction to the third transfer mode power source generation unit 150. In S212, the third recording control unit 105 performs reinitialization in the third transfer mode. The initialization in the third transfer mode (third initialization processing) enables communication with the external recording device 120 in the third transfer mode. That is to say, in a case where the third initialization processing has been executed, the third recording control unit 105 communicates with the external recording device 120 in the third transfer mode.

In S213, the first recording control unit 101 continues initialization in the first transfer mode. Note that as stated earlier, the first initialization processing, which is necessary for the first recording control unit 101 to perform communication in the first transfer mode, was already executed at the time of S208. Therefore, the continuation of initialization in S213 refers to processing that is different from the first initialization processing.

Next, with reference to FIG. 2B, a description is given of determination processing for a case where the combination of "high-speed determination" and "determination with priority on the second transfer mode" has been selected as the determination mode. The system control unit 108 executes the overall control on the determination processing of FIG. 2B in line with a control program stored in the ROM (not shown), unless specifically stated otherwise. Processing of the flowchart of FIG. 2B is started when the system control unit 108 detects that the external recording device 120 has been connected to the external recording device connector 110.

Processing of S214 to S220 is similar to processing of S200 to S206 in FIG. 2A, and thus a description thereof is omitted.

In S221 to S223, the system control unit 108 performs control to determine whether the external recording device 120 is compatible with the third transfer mode. Specifically, in S221, the system control unit 108 performs control to connect the signal lines of the signal line switching unit 107 to the third physical layer 106. In S222, the system control unit 108 supplies the third transfer mode power source to the external recording device 120 by issuing an instruction to the third transfer mode power source generation unit 150. This is because a determination method different from that of FIG. 2A is used for determination of the third transfer mode, and the supply of the third transfer mode power source becomes the trigger for the external recording device 120 to respond with the third transfer mode compatibility signal. In S223, the third recording control unit 105 determines whether the third transfer mode compatibility signal, which indicates that the external recording device 120 is compatible with the third transfer mode, has been input from the external recording device 120 before the elapse of a predetermined time period (a second time period) since the third transfer mode power source was supplied. In a case where the third transfer mode compatibility signal has been input, processing proceeds to S224; otherwise, processing proceeds to S225. The time period from S222 to S223 is shorter than the time period from S207 to S208 in FIG. 2A, and is, for example, a few ms.

In a case where the third transfer mode conforms to the SDExpress standard, the third transfer mode compatibility signal is input from a CLKREQ signal line (a third signal line). Once the power source dedicated to SDExpress (the third transfer mode power source) has been supplied, a response is input to the CLKREQ signal line. It takes up to 1 ms to make a response. That is to say, the predetermined time period (the second time period) in S223 is 1 ms.

In S224, the third recording control unit 105 starts initialization in the third transfer mode (third initialization processing). This enables communication with the external recording device 120 in the third transfer mode. That is to say, in a case where the third initialization processing has been executed, the third recording control unit 105 communicates with the external recording device 120 in the third transfer mode.

In S225, the system control unit 108 stops the supply of the third transfer mode power source to the external recording device 120 by issuing an instruction to the third transfer mode power source generation unit 150. In S226, the system control unit 108 starts initialization in the first transfer mode.

Next, with reference to FIG. 2C, a description is given of determination processing for a case where the combination of "normal determination" and "determination with priority on the third transfer mode" has been selected as the determination mode. The system control unit 108 executes the overall control on the determination processing of FIG. 2C in line with a control program stored in the ROM (not shown), unless specifically stated otherwise. Processing of the flowchart of FIG. 2C is started when the system control unit 108 detects that the external recording device 120 has been connected to the external recording device connector 110.

Processing of S227 is similar to processing of S200 in FIG. 2A, and thus a description thereof is omitted. Processing of S228 to S233 is similar to processing of S207 to S212 in FIG. 2A, and thus a description thereof is omitted. Processing of S234 to S240 is similar to processing of S201 to S207 in FIG. 2A, and thus a description thereof is omitted. As such, the determination processing of FIG. 2A and the determination processing of FIG. 2C are practically the same, except that the order of determination of the second transfer mode and the third transfer mode is reversed.

Next, with reference to FIG. 2D, a description is given of determination processing for a case where the combination of "high-speed determination" and "determination with priority on the third transfer mode" has been selected as the determination mode. The system control unit 108 executes the overall control on the determination processing of FIG. 2D in line with a control program stored in the ROM (not shown), unless specifically stated otherwise: Processing of the flowchart of FIG. 2D is started when the system control unit 108 detects that the external recording device 120 has been connected to the external recording device connector 110.

Processing of S241 is similar to processing of S214 in FIG. 2B, and thus a description thereof is omitted. Processing of S242 to S246 is similar to processing of S221 to S225 in FIG. 2B, and thus a description thereof is omitted. Processing of S247 to S252 is similar to processing of S215 to S220 in FIG. 2B, and thus a description thereof is omitted. Processing of S253 is similar to processing of S226 in FIG. 2B, and thus a description thereof is omitted. As such, the determination processing of FIG. 2B and the determination processing of FIG. 2D are practically the same, except that the order of determination of the second transfer mode and the third transfer mode is reversed.

As described above, according to the first embodiment, the determination processing shown in any of FIG. 2A to FIG. 2D makes it possible to appropriately determine with which standard the external recording device 120 is compatible among the plurality of standards.

Second Embodiment

A second embodiment will be described in relation to a configuration that reduces the time period required for processing in which the communication apparatus determines the transfer mode with which the external recording device 120 is compatible. In the second embodiment, the fundamental configuration of the communication apparatus is similar to that of the first embodiment (see FIG. 1). The following mainly describes the differences from the first embodiment.

Figures 1, 3A:
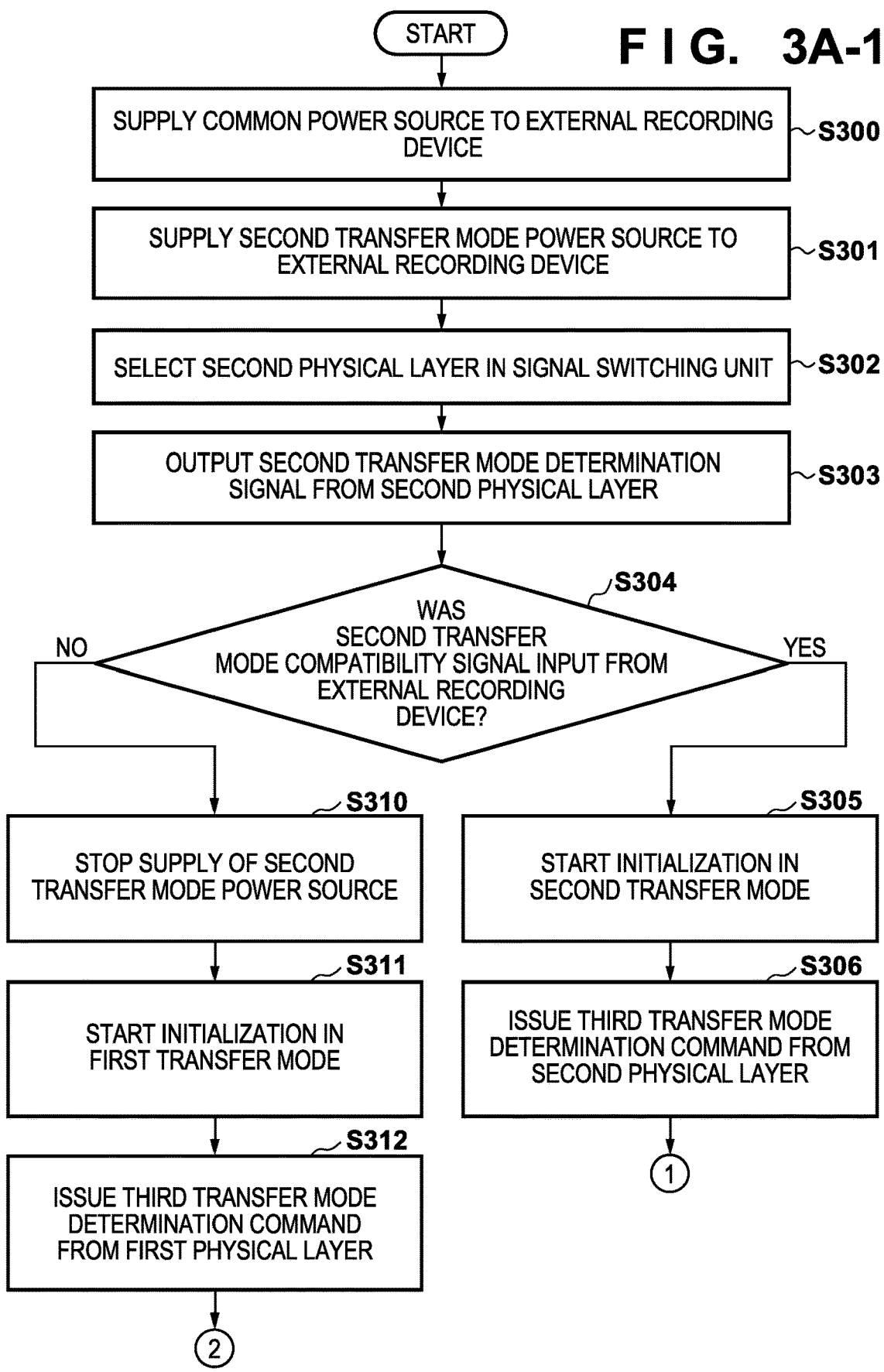
Figures 2, 3A:
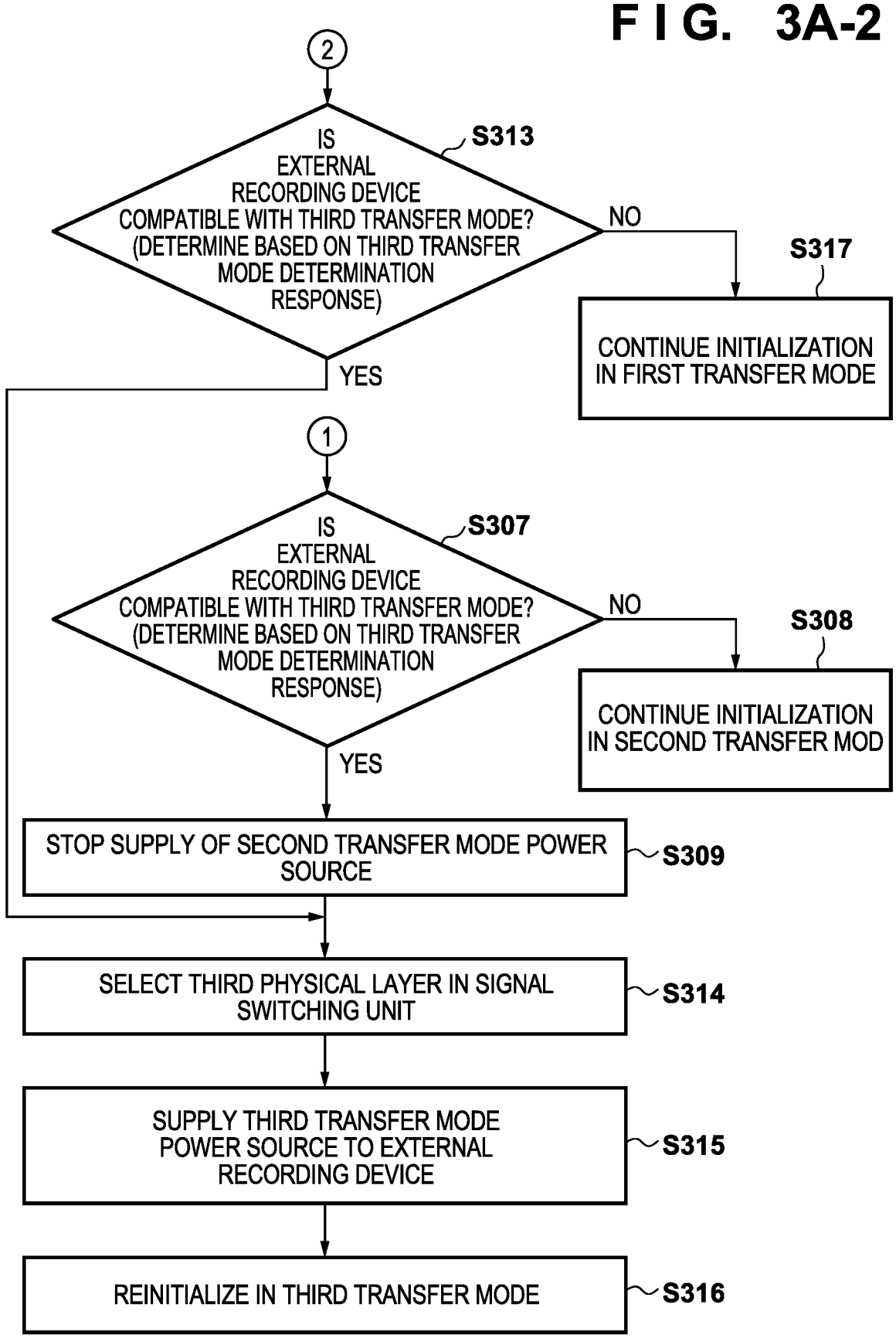
Figure 3C:
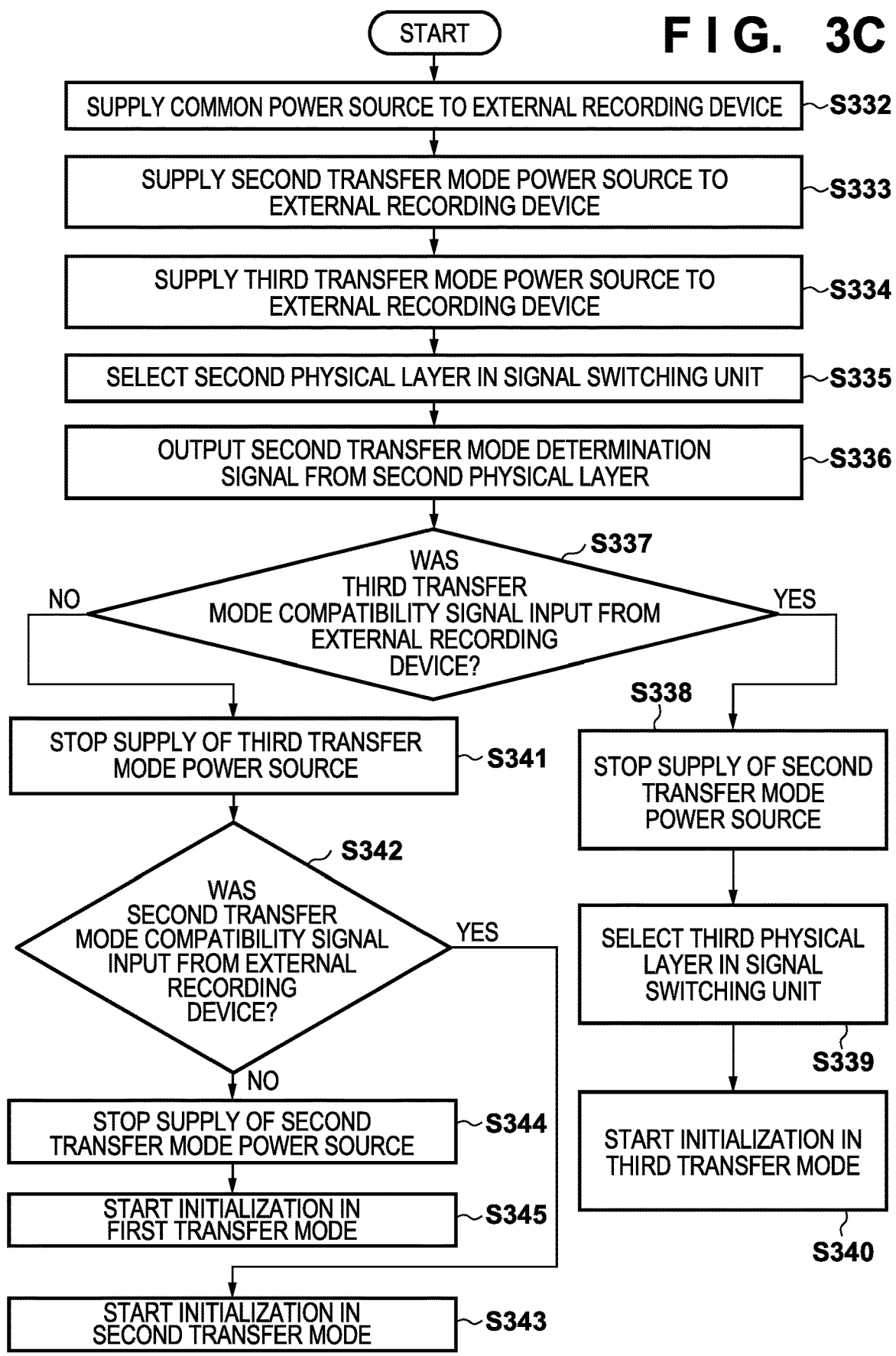
FIG. 3C is a flowchart of determination processing for a case where a combination of "high-speed determination" and "determination with priority on the third transfer mode" has been selected as a determination mode in the second embodiment.

FIG. 3A-1 to FIG. 3C are flowcharts of processing in which the communication apparatus determines the transfer mode with which the external recording device 120 is compatible in the second embodiment.

FIG. 3A-1 and FIG. 3A-2 are flowcharts of determination processing for a case where the combination of "normal determination" and "determination with priority on the second transfer mode" has been selected as the determination mode. According to the determination processing of FIG. 3A-1 and FIG. 3A-2, even in a case where the external recording device 120 has been determined to be compatible with the second transfer mode, determination of the third transfer mode is further made using a high-speed determination method, unlike the case of the first embodiment (FIG. 2A). Therefore, in a case where the external recording device 120 is compatible with both of the second transfer mode and the third transfer mode, the communication apparatus can select the third transfer mode, which is higher in speed than the second transfer mode, as the transfer mode to be used within a relatively short determination time period.

FIG. 3B is a flowchart of determination processing for a case where the combination of "high-speed determination" and "determination with priority on the second transfer mode" has been selected as the determination mode. According to the determination processing of FIG. 3B, the third transfer mode power source is supplied in parallel with the output of the second transfer mode determination signal. Regarding the determination of the input of the second transfer mode compatibility signal and the determination of the input of the third transfer mode compatibility signal, the former is performed first. Therefore, the determination processing of FIG. 3B is similar to the determination processing of FIG. 2B in that the second transfer mode is prioritized over the third transfer mode, but requires a shorter time period in the determination of the third transfer mode after it is determined that the external recording device 120 is not compatible with the second transfer mode.

FIG. 3C is a flowchart of determination processing for a case where the combination of "high-speed determination" and "determination with priority on the third transfer mode" has been selected as the determination mode. According to the determination processing of FIG. 3C, the third transfer mode power source is supplied in parallel with the output of the second transfer mode determination signal. Regarding the determination of the input of the second transfer mode compatibility signal and the determination of the input of the third transfer mode compatibility signal, the latter is performed first. Therefore, the determination processing of FIG. 3C is similar to the determination processing of FIG. 2D in that the third transfer mode is prioritized over the second transfer mode, but requires a shorter time period in the determination of the second transfer mode after it is determined that the external recording device 120 is not compatible with the third transfer mode.

First, with reference to FIG. 3A-1 and FIG. 3A-2, a description is given of determination processing for a case where the combination of "normal determination" and "determination with priority on the second transfer mode" has been selected as the determination mode. The system control unit 108 executes the overall control on the determination processing of FIG. 3A-1 and FIG. 3A-2 in line with a control program stored in the ROM (not shown), unless specifically stated otherwise. Processing of the flowcharts of FIG. 3A-1 and FIG. 3A-2 is started when the system control unit 108 detects that the external recording device 120 has been connected to the external recording device connector 110.

Processing of S300 to S305 is similar to processing of S200 to S205 in FIG. 2A, and thus a description thereof is omitted.

In S306, the second recording control unit 103 issues a third transfer mode determination command from the second physical layer. In the second transfer mode, the second recording control unit 103 can transmit a command that is the same as the command in the first transfer mode that has been described with reference to S208 of FIG. 2A. Also, the transfer speed of the second transfer mode is higher than that of the first transfer mode. Therefore, in the case of the external recording device 120 that has been determined to be compatible with the second transfer mode and has a possibility of being compatible with the third transfer mode, the time period required for the determination of the third transfer mode is reduced by issuing the third transfer mode determination command in the second transfer mode.

In S307, the second recording control unit 103 determines whether the external recording device 120 is compatible with the third transfer mode based on a third transfer mode determination response. In a case where the external recording device 120 is compatible with the third transfer mode, processing proceeds to S309; otherwise, processing proceeds to S308.

In a case where the second transfer mode conforms to the UHS-II standard and the third transfer mode conforms to the SDExpress standard, the third transfer mode determination command is CMD8. Also, the third transfer mode determination response is a response to CMD8, and includes information indicating whether the external recording device 120 is compatible with the third transfer mode. In this way, the execution of the second initialization processing enables communication in the second transfer mode, and determination of the third transfer mode is made based on communication of the command and the response. It takes approximately several tens of ms from the start of the initialization in the second transfer mode (the UHS-II standard) to the issuance of CMD8.

In S308, the second recording control unit 103 continues initialization in the second transfer mode. Note that as stated earlier, the second initialization processing, which is necessary for the second recording control unit 103 to perform communication in the second transfer mode, was already executed at the time of S306. Therefore, the continuation of initialization in S308 refers to processing that is different from the second initialization processing.

Processing of S309 is similar to processing of S206 in FIG. 2A, and thus a description thereof is omitted. Processing of S310 to S317 is similar to processing of S206 to S213 in FIG. 2A, and thus a description thereof is omitted.

Next, with reference to FIG. 3B, a description is given of determination processing for a case where the combination of "high-speed determination" and "determination with priority on the second transfer mode" has been selected as the determination mode. The system control unit 108 executes the overall control on the determination processing of FIG. 3B in line with a control program stored in the ROM (not shown), unless specifically stated otherwise. Processing of the flowchart of FIG. 3B is started when the system control unit 108 detects that the external recording device 120 has been connected to the external recording device connector 110.

Processing of S318 to S319 and S321 to S322 is similar to processing of S214 to S218 in FIG. 2B (S200 to S204 in FIG. 2A), and thus a description thereof is omitted. Processing of S320 is similar to processing of S322 in FIG. 2B, and thus a description thereof is omitted.

Processing of S324 is similar to processing of S225 in FIG. 2B, and thus a description thereof is omitted. Processing of S325 is similar to processing of S219 in FIG. 2B, and thus a description thereof is omitted. Processing of S326 to S331 is similar to processing of S220 to 221 and S223 to S226 in FIG. 2B, and thus a description thereof is omitted.

In FIG. 3B, the execution of processing of S320 and processing of S321 and S322 is carried out in no particular order (that is to say, is not limited to the order shown in FIG. 3B). In other words, in FIG. 3B, processing that serves as the trigger for determination of the third transfer mode and processing that serves as the trigger for determination of the second transfer mode are executed in parallel (substantially at the same time).

Here, it is assumed that the time period from when the third transfer mode power source is supplied to the external recording device 120 to when the third transfer mode compatibility signal is input is 1 ms at the longest. Also, it is assumed that the time period from when the second transfer mode determination signal is output from the second physical layer to when the second transfer mode compatibility signal is input is 200 µs at the longest. In this case, according to FIG. 2B in which the determinations of the second transfer mode and the third transfer mode are made in series, it takes up to 1.2 ms until the determinations of both of the second transfer mode and the third transfer mode are completed. According to FIG. 3B in which these determinations are made in parallel, the time period until the determinations of both of the second transfer mode and the third transfer mode are completed is reduced to up to 1 ms.

The reduction of the determination time period will be described more specifically. In S323, the second recording control unit 103 determines whether the second transfer mode compatibility signal has been input from the external recording device 120 before the elapse of a predetermined time period (a first time period) since the second transfer mode determination signal was output. Also, in S328, the third recording control unit 105 determines whether the third transfer mode compatibility signal has been input from the external recording device 120 before the elapse of a predetermined time period (a second time period) since the third transfer mode power source was supplied. As such, processing of S323 and S328 per se is similar to S218 and S223 of FIG. 2B. However, unlike S218 of FIG. 2B, the supply of the third transfer mode power source has already started at the time of S323 of FIG. 3B. Therefore, while the second recording control unit 103 is waiting for the elapse of the predetermined time period (the first time period) for the determination of S323 in FIG. 3B, the predetermined time period (the second time period) necessary for the determination of S328 elapses partially or entirely. Thus, the time period required for the determinations of both of the second transfer mode and the third transfer mode, is reduced from the sum of the time periods that are required for the respective determinations to the longer one of the time periods that are required for the respective determinations.

Next, with reference to FIG. 3C, a description is given of determination processing for a case where the combination of "high-speed determination" and "determination with priority on the third transfer mode" has been selected as the determination mode. The system control unit 108 executes the overall control on the determination processing of FIG. 3C in line with a control program stored in the ROM (not shown), unless specifically stated otherwise. Processing of the flowchart of FIG. 3C is started when the system control unit 108 detects that the external recording device 120 has been connected to the external recording device connector 110.

Processing of S332 to S336 is similar to processing of S318 to S332 in FIG. 3B, and thus a description thereof is omitted. In S337 that follows S336, determination of third transfer mode is made prior to the second transfer mode, unlike FIG. 3B. Specific processing here is similar to processing of S328 in FIG. 3B, and thus a description thereof is omitted. In a case where the external recording device 120 is compatible with the third transfer mode, processing proceeds to S338; otherwise, processing proceeds to S341.

Processing of S338 to S340 is similar to processing of S326 to S327 and S329 in FIG. 3B, and thus a description thereof is omitted.

Processing of S341 is similar to processing of S330 in FIG. 3B, and thus a description thereof is omitted. Thereafter, the determination of the second transfer mode is made in S342. That is to say, unlike FIG. 3B, the determination of the second transfer mode is made after the determination of the third transfer mode. Specific processing here is similar to processing of S323 in FIG. 3B, and thus a description thereof is omitted. In a case where the external recording device 120 is compatible with the second transfer mode, processing proceeds to S343; otherwise, processing proceeds to S344.

Processing of S343 to S345 is similar to processing of S325, S326, and S331 in FIG. 3B, and thus a description thereof is omitted.

Here, it is assumed that the time period from when the third transfer mode power source is supplied to the external recording device 120 to when the third transfer mode compatibility signal is input is 1 ms at the longest. Also, it is assumed that the time period from when the second transfer mode determination signal is output from the second physical layer to when the second transfer mode compatibility signal is input is 200 µs at the longest. In this case, according to FIG. 2B in which the determinations of the second transfer mode and the third transfer mode are made in series, it takes up to 1.2 ms until the determinations of both of the second transfer mode and the third transfer mode are completed. According to FIG. 3C in which these determinations are made in parallel, the time period until the determinations of both of the second transfer mode and the third transfer mode are completed is reduced to up to 1 ms, similarly to FIG. 3B. That is to say, similarly to the case of FIG. 3B, the time period required for the determinations of both of the second transfer mode and the third transfer mode, is reduced from the sum of the time periods that are required for the respective determinations to the longer one of the time periods that are required for the respective determinations.

As described above, according to the second embodiment, the determination processing shown in any of FIG. 3A-1 to FIG. 3C makes it possible to determine with which standard the external recording device 120 is compatible among the plurality of standards in a short time period compared to the first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus, comprising:
 a connector that includes a plurality of signal lines and connects to an external recording device; and
 at least one processor and/or at least one circuit which functions as a control unit configured to control communication with the external recording device connected to the connector,
 wherein
 the control unit performs control to:
 determine whether a second signal has been input before a predetermined time period elapses since a first signal was output to the external recording device, the second signal indicating that the external recording device is compatible with a second transfer mode;
 in a case where it is determined that the second signal has been input, perform communication in the second transfer mode; and
 in a case where it is determined that the second signal has not been input,
 start first initialization processing for performing communication in a first transfer mode,
 determine whether the external recording device is compatible with a third transfer mode based on communication in the first transfer mode, and
 in a case where it is determined that the external recording device is compatible with the third transfer mode, perform communication in the third transfer mode.

2. The communication apparatus according to claim 1, further comprising:
 a first communication circuit configured to communicate with the external recording device in the first transfer mode;
 a second communication circuit configured communicate with the external recording device in the second transfer mode; and
 a third communication circuit configured communicate with the external recording device in the third transfer mode,
 wherein
 the control unit controls the first communication circuit, the second communication circuit, and the third communication circuit.

3. The communication apparatus according to claim 1, wherein
 the control unit performs control to:
 in a case where it is determined that the second signal has been input before the predetermined time period elapses, execute second initialization processing for performing communication in the second transfer mode and perform communication in the second transfer mode; and
 in a case where it is determined that the second signal has not been input before the predetermined time period elapses,
 start the first initialization processing, and determine whether the external recording device is compatible with the third transfer mode based on communication in the first transfer mode,
 in a case where it is determined that the external recording device is compatible with the third transfer mode, execute third initialization processing for performing communication in the third transfer mode and perform communication in the third transfer mode, and
 in a case where it is determined that the external recording device is not compatible with the third transfer mode, continue the first initialization processing and perform communication in the first transfer mode.

4. The communication apparatus according to claim 1, wherein
 the plurality of signal lines include a first signal line and a second signal line, and
 the control unit determines whether the second signal has been input to the second signal line before the predetermined time period elapses since the first signal was output to the first signal line.

5. The communication apparatus according to claim 1, wherein
 the control unit determines whether the external recording device is compatible with the third transfer mode depending on a response to a predetermined command, the response having been obtained through communication in the first transfer mode.

6. The communication apparatus according to claim 1, wherein
 the control unit performs control to:
 determine whether the external recording device is compatible with the third transfer mode based on communication in the second transfer mode; and
 in a case where it is determined that the external recording device is compatible with the third transfer mode, end communication in the second transfer mode and perform communication in the third transfer mode.

7. The communication apparatus according to claim 2, wherein
 the plurality of signal lines include a first signal line and a second signal line,
 the communication apparatus further includes a switching circuit that selectively connects the first signal line and the second signal line to the second communication circuit or the third communication circuit, the control unit performs control so that the switching circuit connects the first signal line and the second signal line to the second communication circuit before the first signal is output to the first signal line, and in a case where it is determined that the external recording device is compatible with the third transfer mode, the control unit performs control so that the switching circuit connects the first signal line and the second signal line to the third communication circuit.

8. The communication apparatus according to claim 1, wherein a time period required to determine whether the second signal has been input before the predetermined time period elapses since the first signal was output, is shorter than a time period required to start the first initialization processing and determine whether the external recording device is compatible with the third transfer mode based on communication in the first transfer mode.

9. The communication apparatus according to claim 8, wherein the predetermined time period associated with the determination of whether the second signal has been input is 200 μs, and the time period required to start the first initialization processing and determine whether the external recording device is compatible with the third transfer mode based on communication in the first transfer mode is approximately a few hundred ms.

10. The communication apparatus according to claim 1, wherein the first transfer mode is a transfer mode that conforms to a UHS-I standard, the second transfer mode is a transfer mode that conforms to a UHS-II standard or a UHS-III standard, and the third transfer mode is a transfer mode that conforms to an SDExpress standard.

11. The communication apparatus according to claim 10, wherein the control unit determines that the external recording device is compatible with the second transfer mode in a case where an STB.L signal has been input to a D1 signal line in the second transfer mode before the predetermined time period elapses since an STB.L signal was output to a D0 signal line in the second transfer mode, and determines whether the external recording device is compatible with the third transfer mode depending on a response to CMD8, the response having been obtained through communication in the first transfer mode.

12. The communication apparatus according to claim 1, wherein at least one signal line included among the plurality of signal lines is used in any of the first transfer mode, the second transfer mode, and the third transfer mode.

13. The communication apparatus according to claim 1, wherein the first transfer mode and the second transfer mode are compatible, and the first transfer mode and the third transfer mode are compatible, but the second transfer mode and the third transfer mode are not compatible.

14. The communication apparatus according to claim 1, wherein the at least one processor and/or at least one circuit further functions as a selection unit configured to select which one of the second transfer mode and the third transfer mode is to be prioritized, and wherein the control unit performs control to:

in a case where the selection has been made to prioritize the second transfer mode, determine whether the second signal has been input before the predetermined time period elapses since the first signal was output to the external recording device, in a case where it is determined that the second signal has been input, perform communication in the second transfer mode, and in a case where it is determined that the second signal has not been input, start the first initialization processing, and determine whether the external recording device is compatible with the third transfer mode based on communication in the first transfer mode, in a case where it is determined that the external recording device is compatible with the third transfer mode, perform communication in the third transfer mode, and in a case where it is determined that the external recording device is not compatible with the third transfer mode, continue the first initialization processing and perform communication in the first transfer mode; and in a case where the selection has been made to prioritize the third transfer mode, start the first initialization processing, and determine whether the external recording device is compatible with the third transfer mode based on communication in the first transfer mode, in a case where it is determined that the external recording device is compatible with the third transfer mode, perform communication in the third transfer mode, and in a case where it is determined that the external recording device is not compatible with the third transfer mode, end communication in the first transfer mode, and determine whether the second signal has been input before the predetermined time period elapses since the first signal was output to the external recording device, in a case where it is determined that the second signal has been input, perform communication in the second transfer mode, and in a case where it is not determined that the second signal has been input, perform communication in the first transfer mode.

15. The communication apparatus according to claim 1, wherein the at least one processor and/or at least one circuit further functions as a selection unit configured to select which one of the second transfer mode and the third transfer mode is to be prioritized, and wherein the control unit performs control to:

in a case where the selection has been made to prioritize the second transfer mode, determine whether the second signal has been input before the predetermined time period elapses since the first signal was output to the external recording device, in a case where it is determined that the second signal has been input, perform communication in the second transfer mode, and in a case where it is determined that the second signal has not been input, start the first initialization processing, and determine whether the external recording device is compatible with the third transfer mode based on communication in the first transfer mode, in a case where it is determined that the external recording device is compatible with the third transfer mode, perform communication in the third transfer mode, and in a case where it is determined that the external recording device is not compatible with the third transfer mode, continue the first initialization processing and perform communication in the first transfer mode; and in a case where the selection has been made to prioritize the third transfer mode, supply a power source for the third transfer mode, and determine whether a third signal has been input before a second predetermined time period elapses since the power source for the third transfer mode was supplied, the third signal indicating that the external recording device is compatible with the third transfer mode, in a case where it is determined that the third signal has been input, perform communication in the third transfer mode, and in a case where it is determined that the third signal has not been input, stop the supply of the power source for the third transfer mode, and determine whether the second signal has been input before the predetermined time period elapses since the first signal was output to the external recording device, in a case where it is determined that the second signal has been input, perform communication in the second transfer mode, and in a case where it is determined that the second signal has not been input, perform communication in the first transfer mode.

16. A control method for a communication apparatus, wherein the communication apparatus comprises:

a connector that includes a plurality of signal lines and connects to an external recording device; and at least one processor and/or at least one circuit which functions as a control unit configured to control communication with the external recording device connected to the connector, wherein the control method comprises performing, by the control unit, control to:

determine whether a second signal has been input before a predetermined time period elapses since a first signal was output to the external recording device, the second signal indicating that the external recording device is compatible with a second transfer mode;

in a case where it is determined that the second signal has been input, perform communication in the second transfer mode; and in a case where it is determined that the second signal has not been input, start first initialization processing for performing communication in a first transfer mode, determine whether the external recording device is compatible with a third transfer mode based on communication in the first transfer mode, and in a case where it is determined that the external recording device is compatible with the third transfer mode, perform communication in the third transfer mode.

17. A non-transitory computer-readable storage medium which stores a program for causing a communication apparatus, which includes a connector that includes a plurality of signal lines and connects to an external recording device, to execute a control method for controlling communication with the external recording device connected to the connector, wherein the control method comprises performing control to:

determine whether a second signal has been input before a predetermined time period elapses since a first signal was output to the external recording device, the second signal indicating that the external recording device is compatible with a second transfer mode;

in a case where it is determined that the second signal has been input, perform communication in the second transfer mode; and in a case where it is determined that the second signal has not been input, start first initialization processing for performing communication in a first transfer mode, determine whether the external recording device is compatible with a third transfer mode based on communication in the first transfer mode, and in a case where it is determined that the external recording device is compatible with the third transfer mode, perform communication in the third transfer mode.

* * * * *